United States Patent [19]
Field

[11] 3,774,767
[45] Nov. 27, 1973

[54] SKIMMER TRAP
[76] Inventor: Bernard H. Field, Santa Barbara, Calif.
[22] Filed: Nov. 30, 1971
[21] Appl. No.: 203,296

[52] U.S. Cl............ 210/169, 210/DIG. 21, 210/242
[51] Int. Cl......................... E04h 3/20, E02b 15/04
[58] Field of Search............. 210/169, 242, DIG. 21, 210/525

[56] References Cited
UNITED STATES PATENTS

| | | | |
|---|---|---|---|
| 3,152,076 | 10/1964 | Kreutzer | 210/169 |
| 3,244,284 | 4/1966 | Shaffer | 210/242 X |
| 3,625,364 | 12/1971 | La Chance | 210/169 |
| 3,563,380 | 2/1971 | Thomas | 210/242 X |
| 2,975,791 | 3/1961 | Pansini | 210/169 X |
| 3,625,364 | 12/1971 | La Chance | 210/169 |

Primary Examiner—Samih N. Zaharna
Assistant Examiner—T. A. Granger
Attorney—Harvey B. Jacobson

[57] ABSTRACT

An elongated buoyant member having laterally angled inner and outer ends. A flat upstream face is provided by an elongated strip affixed to one side of the member and having an inner end angled outwardly from the angled inner end of the member. The strip is slightly flexible so as to vary the angle of the inner end for an accommodation of variously shaped skimmer boxes. A decorative weight is tied to the trap through an elongated cordlike member for a positioning of the trap and a clip-on auxiliary screen is provided to selectively give a greater operative depth to the trap.

2 Claims, 4 Drawing Figures

PATENTED NOV 27 1973 3,774,761

SKIMMER TRAP

The present invention generally relates to pool skimmers and is more particularly concerned with a debris trap utilized in conjunction with a skimmer or similar debris disposal device.

It is conventional in swimming pools to use a circulation system whereby pump means are utilized to effect a constant flow from the pool through appropriate filtering and conditioning apparatus and back into the pool. This action sets up circular flows or currents within the pool itself with any debris within the pool circulating with the surface flow of water. Inasmuch as this debris, if it remains within the pool for any length of time, will normally settle to the bottom of the pool, it is a primary intention of the invention to provide means for effectively gathering and directing the debris into the recirculation system, or more particularly the skimmer or the like.

Other objects of the invention include the provision of a trap which is buoyant, and thus self-sustaining on the surface of the water; a trap which is of lightweight non-corrosive plastic construction; a trap which is easily temporarily positioned and adjusted as required; and a trap which, while structurally simple, is highly effective in performing its intended functions.

Basically, the trap consists of an elongated buoyant tubular member having angled inner and outer ends. A water flow intercepting flat strip is affixed to the upstream side of the tubular member with the strip including a skimmer-engaging angled inner end. The corresponding inner end of the buoyant member engages the side of the pool and properly orientates the trap at a projecting 45° angle for an interception of the flow-impelled debris and the directing thereof into the skimmer. The outer end of the buoyant member is directed upstream for a confining of the floating debris. The entire trap is stabilized and retained in position by an elongated cord-like member extending from a midpoint along the trap to a simple decorative weight positioned as desired along the pool edge. As an auxiliary aid in the gathering of the debris, an arcuate shield can be removably clipped on the tubular member.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
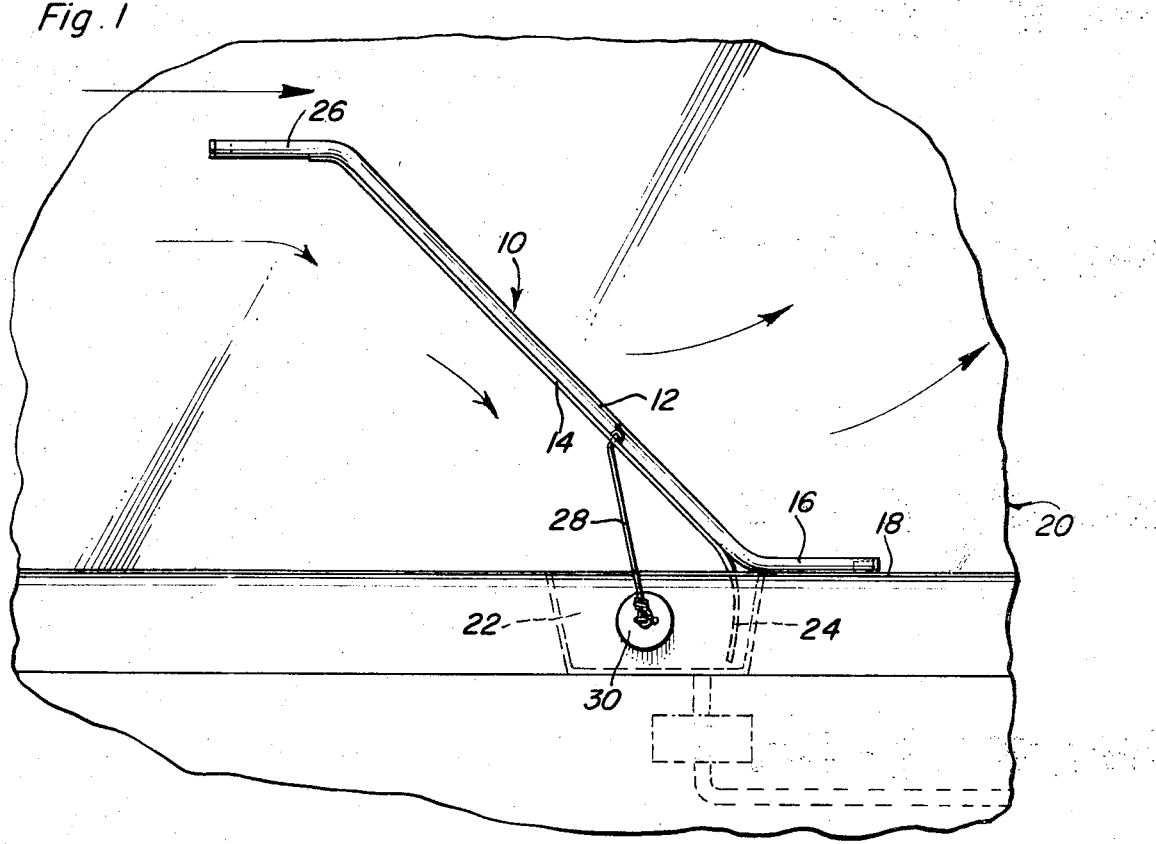
FIG. 1 is a top plan view of the trap in operative position in a pool.
Figure 2:
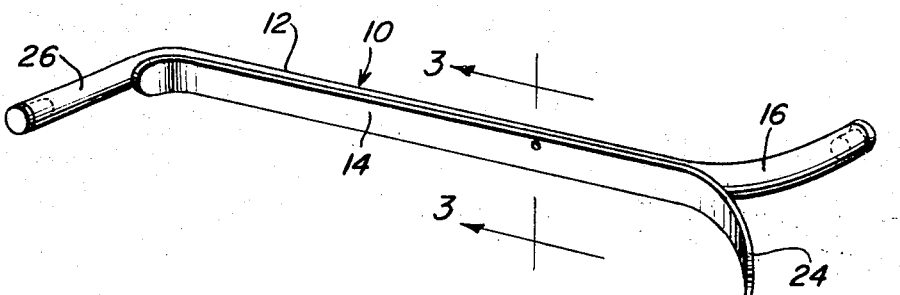
FIG. 2 is a perspective view of the trap.
Figure 4:
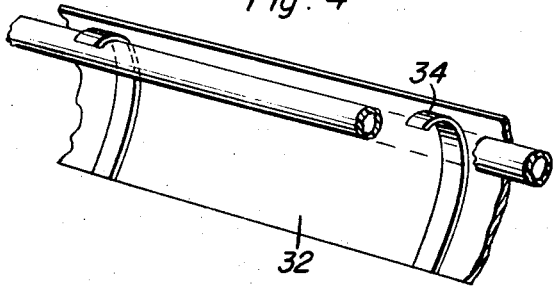
FIG. 4 is a perspective view illustrating the auxiliary shield and the manner of mounting thereof.
Figure 3:
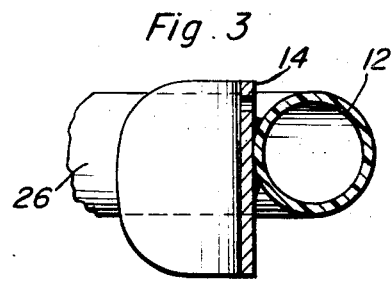
FIG. 3 is an enlarged cross-sectional view taken substantially on a plane passing along line 3—3 in FIG. 2.

Referring now more specifically to the drawings, the skimmer trap is generally designated by reference numeral 10. This trap consists primarily of an elongated buoyant cylindrical tube 12 having an elongated flat strip 14 affixed to the upstream face thereof.

The tube 12 has an inner end 16 bent at approximately 135° angle whereby upon a flat engagement of this inner end 16 against the side 18 of the pool 20, the major length of the trap 10 will project inwardly of the pool at approximately a 45° angle, such being best contemplated to intercept and direct the debris toward the skimmer or skimmer box 22. It will be noted that the angled inner end 16 of the buoyant member 12 engages the pool wall 18 immediately downstream of the skimmer box 22. The flat strip 14, paralleling the member 12 along a major portion of the length thereof, also has an angularly directed inner end 24. This inner end angles away from the inner end 16 of the member 12 and engages within the skimmer box 22 so as to form, in conjunction with the angled buoyant member end 16, a corner-engaging arrangement contemplated to stably position and orientate the trap 10. It is preferable that the strip 14, rigidly fixed to the member 12 along a major portion of the length thereof, be slightly flexible or resiliently flexible whereby the angled inner end 24 thereof can be deformed or bent so as to more closely conform to variously shaped skimmer boxes 12. The transition between the linear portion of the strip 14 and the skimmer box received inner end 24 thereof is to be smoothly arcuate so as to ensure a proper inward directing of the gathered debris.

The outer end 26 of the buoyant member 12 is also angled at approximately 135° to the linear portion of the member 12 and projects upstream in a manner so as to effectively confine and direct the surface debris. It will be noted that the strip 14 has the outer end thereof curved about the outer bend of the member 12 so as to follow the upstream extending end 26 of the member 12 for a short portion of the length thereof.

The utilization of a flat strip 14 so as to provide a flat face within the flow path is considered particularly significant in that the flat surface greatly increases the meniscus effect which in turn results in significantly improved cleaning efficiency.

The mounting and temporary retention of the trap is simply effected through the utilization of an elongated cord-like member 28 having one end affixed to the strip 14 or buoyant member 12 and the second end to a small weight 30, approximately two pounds, which can, for purposes of appearance, be decorative in nature. Thus, the trap 10 is floated on the water and the angled inner ends 16 and 24 engaged with the pool side and skimmer box, after which the weight 30 is properly positioned on the pool edge so as to, through the tensioned cord-like member 28, retain the desired angular orientation of the trap 10. As will be readily appreciated, no permanent fixtures or mechanical interlocks or the like are required in positioning the trap 10. This greatly facilitates both the positioning and removal of the trap as well as simplifying the construction thereof.

Another advantage in the particular manner in which the trap 10 is mounted resides in the fact that should a swimmer accidentally come in contact therewith, the trap will merely shift without damage to the trap or harm to the swimmer.

As will be readily appreciated, the trap 10 is to be positioned within the flow path generated by the pool recirculation system. Further, it is contemplated that the trap 10 extend across only approximately 20 percent of the width of the pool, thus permitting use of the pool while still maintaining a highly effective cleaning action.

In view of the tendency of surface debris to rapidly sink to the bottom of the pool, an attachment in the nature of an arcuate shield or screen 32 can be utilized. The shield 32 will incorporate, along the length thereof, spaced downwardly directed clips 34 which snap over the tubular member 12 for a mounting of the shield 32. In this manner, the effective depth of the trap 10 can be extended, catching debris which would normally tend to flow under member 12. If so desired, the shield 32 can be permanently fixed to member 12.

While the significance of the flat strip 14 has been emphasized, the buoyant member 12 itself will effectively trap and direct the debris should the strip 14 not be used. However, even in the absence of the strip 14 along member 12, a strip portion equivalent to the inner end portion 24 thereof will be affixed to the buoyant member 12 for a mounting of the trap in the manner shown in FIG. 1.

From the foregoing, it will be appreciated that a structurally simple although highly unique skimmer trap has been defined. The trap is particularly constructed to easily mount without requiring any permanent pool atttachments and function so as to smoothly and effectively direct surface debris into the skimmer.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. For use in conjunction with a pool skimmer or like disposal means, a trap positionable in outwardly projecting relation from a skimmer into a water flow path, said trap including an elongated buoyant member having an upstream flow intercepting side, said buoyant member including integral inner and outer ends, the inner end of the buoyant member being angularly orientated and engageable against a pool side adjacent a skimmer whereby said buoyant member projects into the pool at an angle determined by the angular orientation of the inner end, a strip-like member affixed to the buoyant member adjacent the inner end thereof, said strip-like member angling away from the buoyant member in an opposite direction from the inner end of the buoyant member for reception within a skimmer box, the box engaging strip-like member cooperating with the pool side engaging inner end of the buoyant member to position the trap, means for releasably retaining said buoyant member in position within a pool, said strip-like member being flat and extending and presenting a flat face along substantially the entire upstream side of the buoyant member, and an elongated vertically arcuate shield positionable along said buoyant member and depending therebelow, said shield including clip means thereon selectively receivable over the buoyant member for an attachment of the shield thereto, said shield being of a depth sufficient so as to project below said flat strip-like member.

2. For use in conjunction with a pool skimmer or like disposal means, a trap positionable in outwardly projecting relation from a skimmer into a water flow path, said trap including an elongated buoyant member having an upstream flow intercepting side, said buoyant member including integral inner and outer ends, the inner end of the buoyant member being angularly orientated and engageable against a pool side adjacent a skimmer whereby said buoyant member projects into the pool at an angle determined by the angular orientation of the inner end, a strip-like member affixed to the buoyant member adjacent the inner end thereof, said strip-like member angling away from the buoyant member in an opposite direction from the inner end of the buoyant member for reception within a skimmer box, the box engaging strip-like member cooperating with the pool side engaging inner end of the buoyant member to position the trap, means for releasably retaining said buoyant member in position within a pool, and an elongated vertically arcuate shield positionable along said buoyant member and depending therebelow, said shield including clip means thereon selectively receivable over the buoyant member for an attachment of the shield thereto, said shield being of a depth sufficient so as to project below said flat strip-like member.

* * * * *